(12) United States Patent  
Weerawarna et al.

(10) Patent No.: US 9,056,792 B2
(45) Date of Patent: Jun. 16, 2015

(54) INTERNALLY CURING CEMENT BASED MATERIALS

(75) Inventors: S. Ananda Weerawarna, Seattle, WA (US); David J. O'Callaghan, Bonney Lake, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 118 days.

(21) Appl. No.: 13/495,646

(22) Filed: Jun. 13, 2012

(65) Prior Publication Data

US 2013/0000523 A1 Jan. 3, 2013

Related U.S. Application Data

(60) Provisional application No. 61/503,523, filed on Jun. 30, 2011.

(51) Int. Cl.
| | |
|---|---|
| *C04B 28/02* | (2006.01) |
| *C04B 18/24* | (2006.01) |
| *C04B 24/38* | (2006.01) |
| *C09D 101/02* | (2006.01) |
| *C04B 20/10* | (2006.01) |

(52) U.S. Cl.
CPC .............. *C04B 28/02* (2013.01); *C09D 101/02* (2013.01); *C04B 20/1048* (2013.01); *C04B 18/24* (2013.01); *C04B 24/383* (2013.01)

(58) Field of Classification Search
CPC .............. A61K 9/2866; C04B 24/383; C04B 20/1048; C04B 20/006; C04B 20/023; C08L 1/26; C08L 1/32; C08L 95/005; C09D 101/02; D21C 9/00
See application file for complete search history.

(56) References Cited

U.S. PATENT DOCUMENTS

| | | | |
|---|---|---|---|
| 4,374,702 A * | 2/1983 | Turbak et al. | 162/100 |
| 5,154,771 A | 10/1992 | Wada et al. | |
| 5,667,637 A | 9/1997 | Jewell | |
| 5,731,083 A * | 3/1998 | Bahia et al. | 428/393 |
| 6,379,494 B1 | 4/2002 | Jewell et al. | |
| 6,524,348 B1 | 2/2003 | Jewell et al. | |

(Continued)

FOREIGN PATENT DOCUMENTS

| | | |
|---|---|---|
| CN | 101058943 A | 10/2007 |
| WO | 9716595 A1 | 5/1997 |
| WO | 2011394234 A1 | 4/2011 |

*Primary Examiner* — Kaj K Olsen
*Assistant Examiner* — Karam Hijji
(74) *Attorney, Agent, or Firm* — Timothy M. Whalen; Weyerhaeuser Law Dept.

(57) ABSTRACT

A method of curing cementitious material comprising added a fibrillated carboxyalkyl cellulose, cellulose alkylsulfonic acid, phosphorylated cellulose or sulfated cellulose having a degree of substitution of 0.01 to 0.45 to the material during mixing. The fibrillated carboxyalkyl cellulose, cellulose alkylsulfonic acid, phosphorylated cellulose or sulfated cellulose may also include bleached or partially bleached wood pulp fiber. The fibrillated carboxyalkyl cellulose, cellulose alkylsulfonic acid, phosphorylated cellulose or sulfated cellulose has a substituent content of from 10 to 150 meq/100 g cellulose fiber. The fibrillated carboxyalkyl cellulose, cellulose alkylsulfonic acid, phosphorylated cellulose or sulfated cellulose is 0.1 to 5% by weight of the dry weight of the cementitious material. The structure produced by the method. The autogenous shrinkage of the cementitious material is reduced.

20 Claims, 16 Drawing Sheets

(56) References Cited

U.S. PATENT DOCUMENTS

| | | |
|---|---|---|
| 6,627,750 B2 | 9/2003 | Wang |
| 6,821,383 B2 | 11/2004 | Shore et al. |
| 7,135,557 B2 | 11/2006 | Weerawarna et al. |
| 2003/0054167 A1* | 3/2003 | Wang .......................... 428/364 |
| 2007/0246857 A1* | 10/2007 | Kurtis et al. ................. 264/236 |
| 2010/0162926 A1 | 7/2010 | Thomson et al. |
| 2010/0300330 A1 | 12/2010 | Hamilton et al. |
| 2011/0073015 A1 | 3/2011 | Westland et al. |

\* cited by examiner

INTERNALLY CURING CEMENT BASED MATERIALS

CROSS-REFERENCE TO RELATED APPLICATION

This application is entitled to and claims the benefit of priority under 35 U.S.C. §119 from U.S. Provisional Patent Application Ser. No. 61/503,523 filed Jun. 30, 2011, and titled INTERNALLY CURING CEMENT BASED MATERIALS the contents of which are incorporated herein by reference.

FIELD OF THE INVENTION

The present invention relates generally to methods of and materials for internal curing cement-based materials and the resultant product.

BACKGROUND OF THE INVENTION

Modern day construction uses concrete in many forms from conventional concrete to high performance concrete. The type of concrete used will depend upon its use and the strength required. Conventional concrete has strengths in the range of 30 to 50 megaPascals (MPa). High performance concrete has strengths in the range of 200 to 400 MPa. Water usage also varies in the concretes. Conventional concrete has a water to cement material ratio (w/cm) of 0.4 to 0.6. High performance concrete has a water to cement material ratio of 0.2 to 0.3. This is because of the additives in high performance concrete. Low water to cement ratios impart high strength to the concrete.

This low water to cement material ratio leads to a concern about autogenous shrinkage. Autogenous shrinkage is internal shrinkage. A cement or concrete structure has less volume than the original water and cement material elements. As it cures it contracts. In the early curing stages of a cement or concrete structure the cement or concrete is fluid and can contract. As the cement or concrete sets up and solidifies its ability to contract diminishes. A lack of water in the internal portion of a cement or concrete structure leads to internal or autogenous shrinkage without the contraction of the entire structure. This leads to cracks and inadequate curing or strength development. As the structure solidifies there is no way to supply water to the internal portion from the outside.

There is a need to provide water to the internal portion of a cement or concrete structure to avoid internal or autogenous shrinkage.

There is also a need to provide this water while maintaining the initial consistency of the cement water mix, keeping the initial setting time within specifications and keeping the final setting time within normal limits.

DETAILED DESCRIPTION OF THE INVENTION

The present invention proposes to place a water containing material within cementitious material structures, cement, concrete or high performance concrete, and return it as needed during the curing process. This material will take up excess water from the cementitious material and return water to the cement or concrete during its curing cycle.

The material is a fibrillated carboxyalkyl cellulose, cellulose alkylsulfonic acid, phosphorylated cellulose or sulfated cellulose having a low degree of substitution (DS) of 0.01 to 0.45 (hereafter fibrillated low DS carboxyalkyl cellulose, fibrillated low DS cellulose alkylsulfonic acid, fibrillated low DS phosphorylated cellulose or fibrillated low DS sulfated cellulose). The degree of substitution is the average number of moles of carboxyalkyl, alkylsulfonic acid, phosphate or sulfate groups in the cellulose polymer form the cellulose derivative. The cellulose fibers can be bleached or partially bleached. A partially bleached fiber would have a kappa of around 8 or an unwhitened brightness of 55 to 65 GE brightness.

The low DS carboxyalkyl cellulose can be either a low DS carboxymethyl cellulose or a low DS carboxyethyl cellulose. The low DS cellulose alkylsulfonic acid can be either a low DS cellulose ethylsulfonic acid or a low DS propylsulfonic acid.

Figure 14:
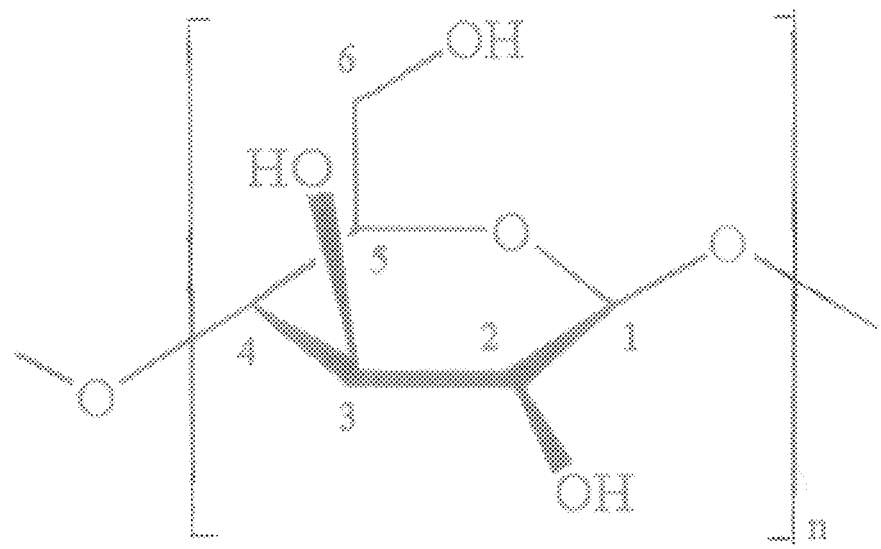
FIG. 14 is a representation of one unit of a cellulose molecule.
Figure 15:
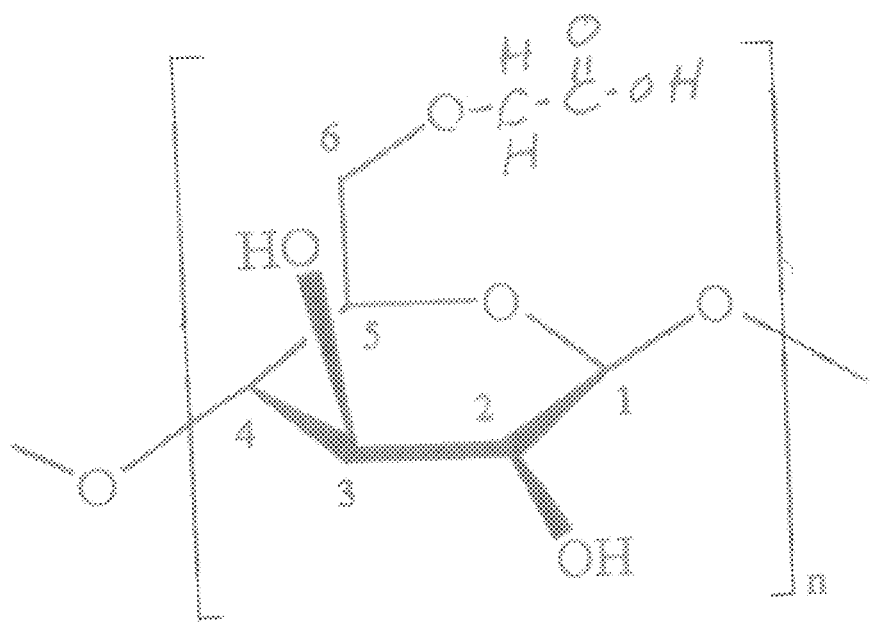
FIG. 15 is a representation of one unit of a carboxymethyl cellulose molecule.
Figure 16:
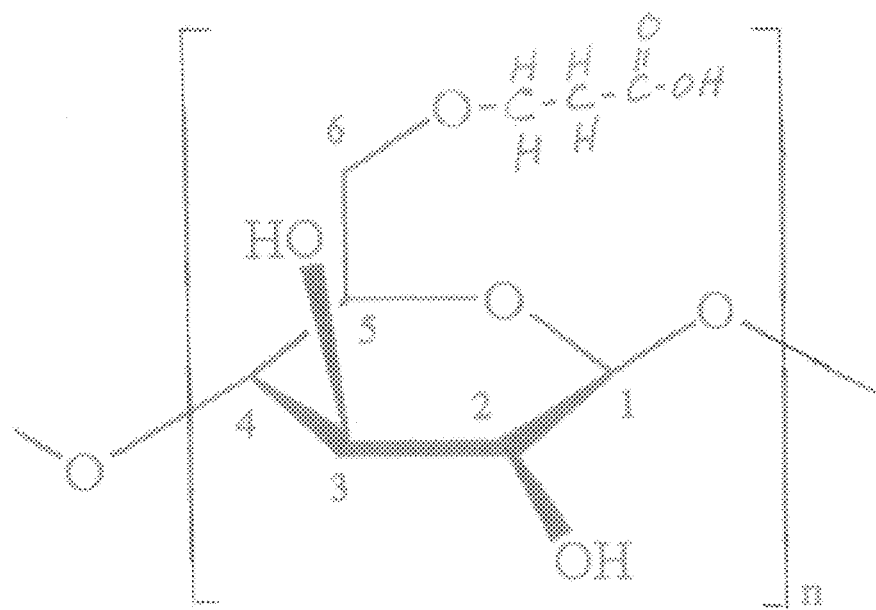
FIG. 16 is a representation of one unit of a carboxyethyl cellulose molecule.

The structure of one unit of cellulose is shown in FIG. 14 and the structures of one unit of carboxymethyl cellulose and carboxyethyl cellulose are shown in FIGS. 15 and 16. The numbers 1-6 on these diagrams are the location of carbon atoms. The carboxyalkyl cellulose may also be attached to the oxygen attached to positions 2 and/or 3 as well as position 6 or instead of position 6. Carboxyalkyl cellulose is known and the methods of making it are known.

Figure 17:
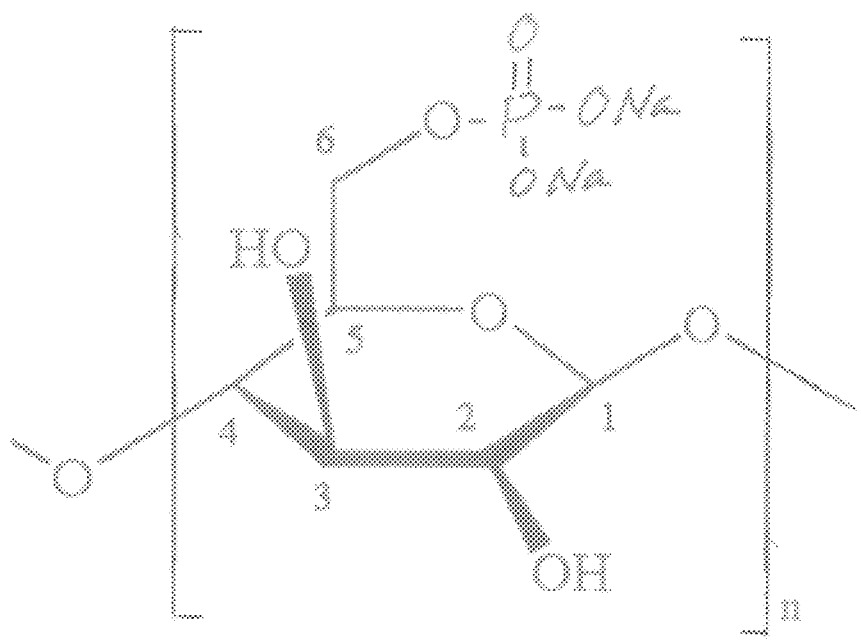
FIG. 17 is a representation of one unit of a phosphorylated cellulose molecule.
Figure 18:
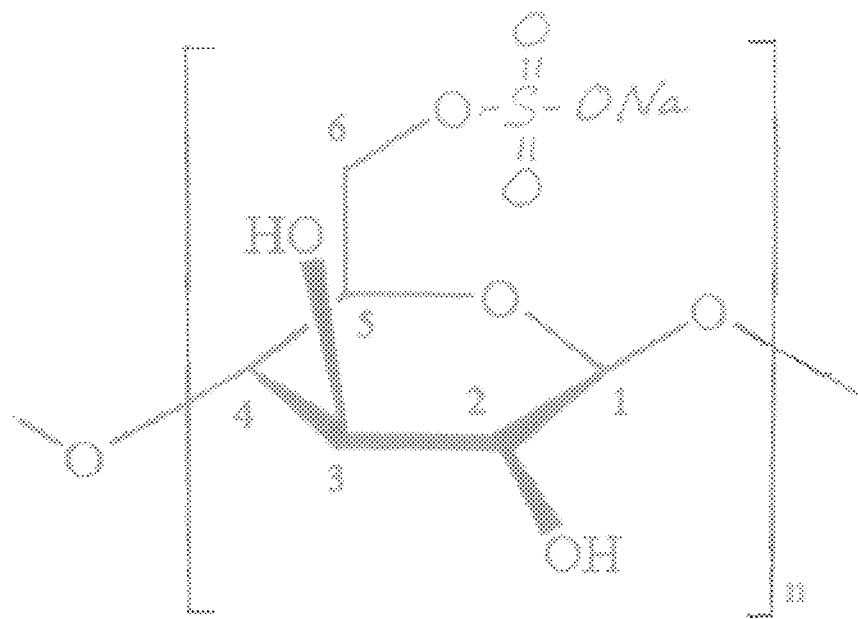
FIG. 18 is a representation of one unit of a sulfated cellulose molecule.
Figure 19:
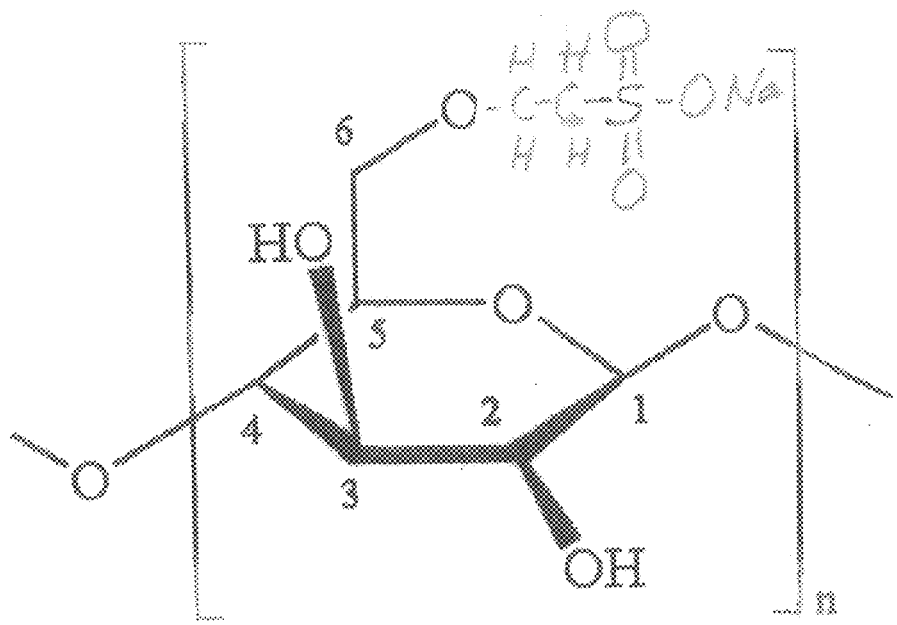
FIG. 19 is a representation of one unit of a cellulose ethylsulfonic acid molecule.

Other materials that can be used are fibrillated cellulose alkylsulfonic acid, fibrillated phosphorylated cellulose or fibrillated sulfated cellulose. These also should have a DS of 0.01 to 0.45. These can be made by known reactions. Phosphorylation can be performed using phosphoric acid and a suitable catalyst such as urea. Sulfation can be achieved using sulfuric acid and acetic acid. Both of these are esters and may be made by the standard reactions for making esters. The structures of these chemicals are shown in FIGS. 17 and 18. Again the phosphate and sulfate may be attached to the oxygen attached to positions 2 and/or 3 as well as position 6 or instead of position 6. FIG. 19 shows the structure of cellulose ehtylsulfonic acid ether functionality at the 6 position of the anhydroglucose unit. It can be made using a standard ether reaction. It may also be attached at the 2 and/or 3 positions as described above.

Fibrillated carboxyalkyl cellulose will be used as an example of these materials and their use in cementitious mixtures.

The fibrillated carboxyalkyl cellulose, cellulose alkylsulfonic acid, phosphorylated cellulose or sulfated cellulose is made by applying a high shear force on the unfibrillated fiber having a DS of 0.01 to 0.45 in water to pull apart the unfibrillated fibers into fibrillated material described below. The energy applied and the method of fibrillation determines the level of fibrillation. Low energy fibrillation of low DS unfibrillated fibers first form fragmented sheets or other aggregates of nano and micro fibrils. High energy fibrillation forms singulated nano and micro fibrils. Singulated nano or micro fibrils or fragmented sheets or other aggregates of entangled nano or micro fibrils (hereafter also called elements) are suitable for removing water from cement and returning water to cement or concrete during the curing cycle. The fibrillated carboxyalkyl cellulose, cellulose alkylsulfonic acid, phosphorylated cellulose or sulfated cellulose having a DS of 0.01 to 0.45 may have one or more of these elements. The elements may also be attached to each other. The carboxyalkyl cellulose can be either carboxymethyl cellulose (CMC) or carboxyethyl cellulose. The nano and micro size refers to the width of the fibril. Nano fibrils by definition are below 100 nm in width. Micro fibrils range from 100 nm to 4000 nm in width. The carboxyalkyl cellulose, cellulose alkylsulfonic acid, phosphorylated cellulose or sulfated cellulose is sheared or pulled apart into fibrils having a high aspect ratio of width to length. The fibrils can be interconnected to form a web-like material. Typical fibrillated carboxymethyl cellulose is shown in FIGS. 1-6. Phosphorylated cellulose, sulfoalkyl cellulose and sulfated cellulose would have a similar appearance.

Carboxymethyl cellulose and carboxyethyl cellulose with DS less than about 0.45 is not soluble in water and can be fibrillated by high shear blending in water.

The purpose of the fibrillated carboxyalkyl cellulose, fibrillated cellulose alkylsulfonic acid, fibrillated phosphorylated cellulose or fibrillated sulfated cellulose is to provide better distribution of carboxyalkyl cellulose, cellulose alkylsulfonic acid, phosphorylated cellulose or sulfated cellulose fiber in the cementitious material, and overcome the resistance to flowability of wet concrete encountered when mixed with non-fibrillated chemically modified cellulose fibers.

Bleached cellulose wood pulp fibers typically have a carboxyl content of 5 or below milliequivalents per 100 g of cellulose fiber (meq/100 g). Oxidized cellulose fibers can have about 150 meq/100 g of carboxyl groups in cellulose fibers. This, however, is a difficult and expensive process. It is easier and more efficient to add carboxyalkyl groups or alkylsulfonic groups, or phosphate groups or sulfate groups to obtain 100 to 150 meq of these functional groups/100 g or fibers or higher.

The fibrillated low DS carboxymethyl cellulose, the fibrillated low DS cellulose alkylsulfonic acid, the fibrillated low DS phosphorylated cellulose and fibrillated sulfated cellulose can be better dispersed in the cementitious matrix than non-fibrillated fibers, and can provide a more workable mixture, which may need less superplasticizer.

The fibrillated low DS carboxyalkyl cellulose, cellulose alkylsulfonic acid, phosphorylated cellulose or sulfated cellulose may be mixed with a bleached or partially bleached cellulose wood pulp fiber which is either regular size or fibrillated to nano or micro size fibrils. The cellulose fiber and carboxyalkyl cellulose, cellulose alkylsulfonic acid, phosphorylated cellulose or sulfated cellulose mixture is formed by mixing the fibrillated low DS carboxyalkyl cellulose, cellulose alkylsulfonic acid, phosphorylated cellulose or sulfated cellulose with the cellulose fiber under shear.

When a mixture of cellulose fibers and fibrillated low DS carboxyalkyl cellulose is used, the cellulose fibers adsorb some fibrillated carboxyalkyl cellulose from the dispersion. In one embodiment the mixture of fibrillated low DS carboxyalkyl cellulose and cellulose fibers has a total carboxyalkyl content of 10 to 100 meq/100 g. In another embodiment the mixture of fibrillated low DS carboxyalkyl cellulose and cellulose fibers has a total carboxyalkyl content of 10 to 50 meq/100 g. In another embodiment the mixture of fibrillated low DS carboxyalkyl cellulose and cellulose fibers has a total carboxyalkyl content of 20 to 40 meq/100 g. In another embodiment the mixture of fibrillated low DS carboxyalkyl cellulose and cellulose fibers has a total carboxyalkyl content of 25 to 30 meq/100 g. In another embodiment the mixture of fibrillated low DS carboxyalkyl cellulose and cellulose fibers has a total carboxyalkyl content of 50 to 150 meq/100 g. These same amounts would apply for alkyl sulfonic acid groups, phosphate groups and sulfate groups when cellulose alkylsulfonic acid, phosphorylated cellulose or sulfated cellulose is used.

Figure 4:
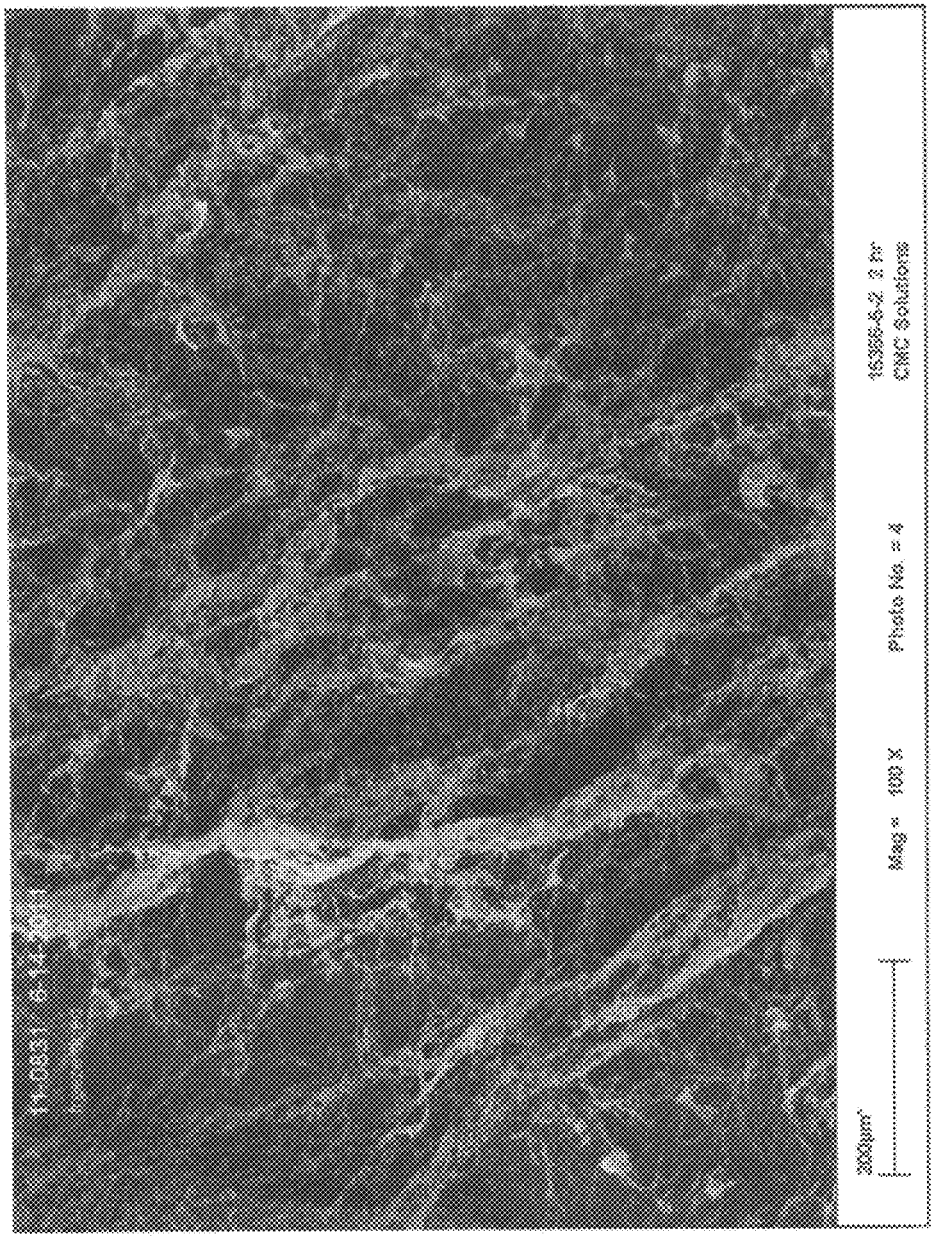
FIGS. 4-6 are photomicrographs of a another sample of fibrillated carboxymethyl cellulose at magnifications of 100 times, 1000 times and 10,000 times respectively.
Figure 5:
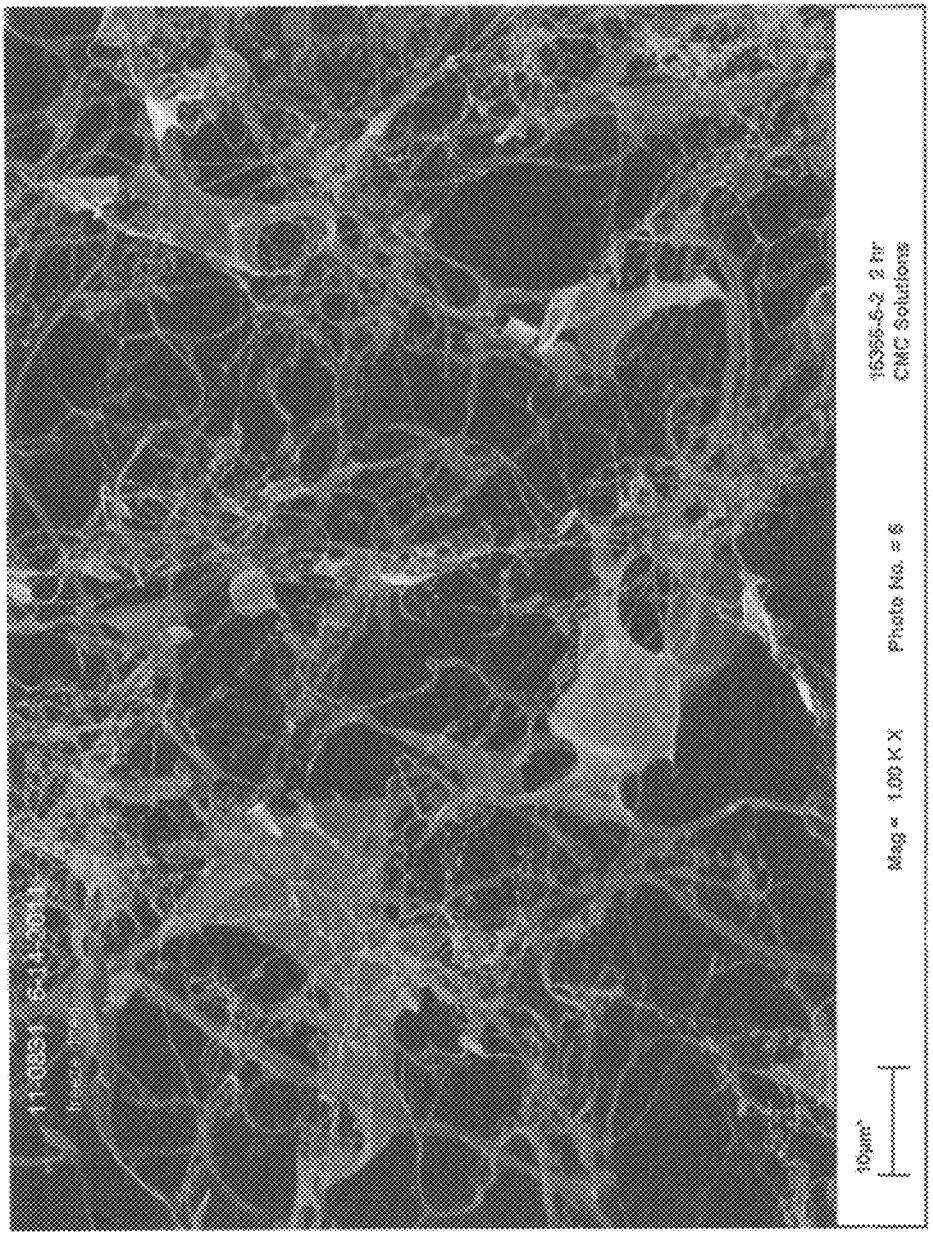
Figure 6:
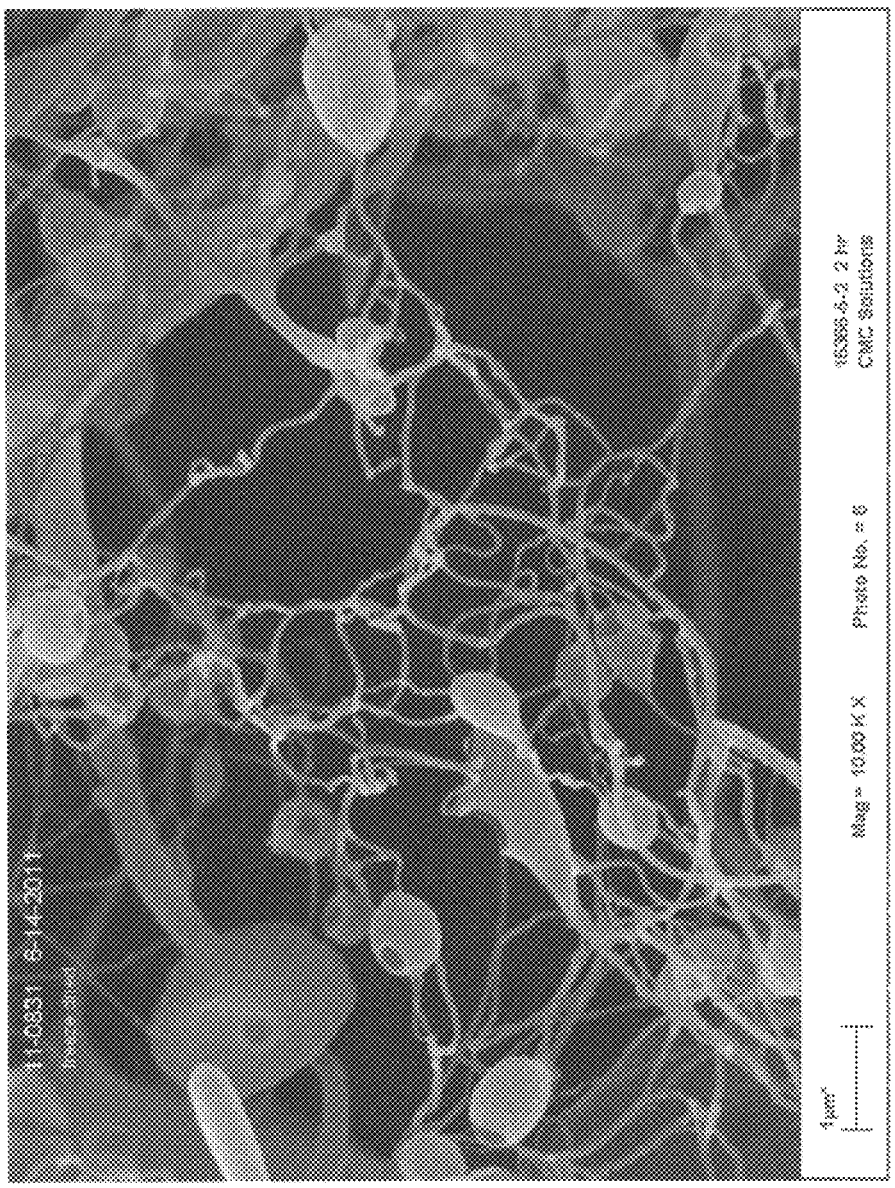

Cellulose is a carbohydrate polymer consisting of a long chain of glucose units, all β-linked through the 1-4 positions. The structure of cellulose is shown in FIG. 4. Native plant cellulose molecules may have upwards of 2200 of the anhydroglucose units shown in FIG. 4. The number of units is normally referred to as degree of polymerization or simply D.P. Some loss of D.P. occurs during purification of the cellulose, as in using a chemical pulping process to pulp the wood to obtain the cellulose and separate it from the lignin and some of the hemicellulose in the wood. The D.P. of the final pulp will depend upon the pulping process used.

Each hydrogen atom of secondary hydroxyl groups at the 2 and 3 positions and the primary hydroxyl group at the six position in the cellulose anhydroglucose unit can be removed and be replaced with a carboxymethyl group, an alkylsulfonic acid, a phosphate group or a sulfate group. This process and the reaction performing the transformation is known as substitution. When cellulose in fiber form is carboxyalkylated in alcohol/water mixtures using bases such as sodium hydroxide, carboxyalkylation occurs mainly at the 6 position.

Every anhydroglucose unit of the cellulose molecule chain is not carboxyalkylated. The carboxyalkyl content of the derivitized cellulose molecules present will be determined by the carboxyalkyl content of the carboxyalkyl cellulose fibers. The degree of substitution is the average number of moles of hydroxyl groups in the cellulose polymer that react to form the cellulose derivative. This is true for carboxyalkyl cellulose, carboxymethyl cellulose, carboxyethyl cellulose, cellulose ethylsulfonic acid, cellulose propylsulfonic acid, phosphorylated cellulose or sulfated cellulose.

The carboxyalkylated, alkyl sulfonated, phosphorylated or sulfated cellulose wood pulp fibers do not have side chains attached to the cellulose molecule through the carboxyalkyl, alkylsulfonic acid, phosphate or sulfate group. The sodium, potassium, ammonium salts of these low DS cellulose derivatives are most suitable for this application.

The fibrillated low DS carboxyalkyl cellulose, cellulose alkylsulfonic acid, phosphorylated cellulose or sulfated cellulose or the cellulose fibers mixed with fibrillated low DS carboxyalkyl cellulose, cellulose alkylsulfonic acid, phosphorylated cellulose or sulfated cellulose is incorporated into cementitious materials as their sodium, potassium or ammonium salts. In one embodiment the fibrillated low DS carboxyalkyl cellulose or cellulose alkylsulfonic acid or phosphorylated cellulose or sulfated cellulose or the cellulose fibers mixed with fibrillated carboxyalkyl cellulose or cellulose alkylsulfonic acid or phosphorylated cellulose or sulfated cellulose forms from 0.1 to 5% by weight of the weight of the cementitious material. The weight of the cementitious material is the weight on a dry basis of the cement and also of the silica fume in those mixes in which silica fume is used. In another embodiment the fibrillated low DS carboxyalkyl cellulose or cellulose alkylsulfonic acid or phosphorylated cellulose or sulfated cellulose or the cellulose fibers mixed with fibrillated low DS carboxyalkyl cellulose or cellulose alkylsulfonic acid or phosphorylated cellulose or sulfated cellulose forms from 0.5 to 3% by weight of the weight of the cementitious material. In another embodiment the fibrillated low DS carboxyalkyl cellulose or cellulose alkylsulfonic acid or phosphorylated cellulose or sulfated cellulose or the cellulose fibers mixed with fibrillated low DS carboxyalkyl cellulose or cellulose alkylsulfonic acid or phosphorylated cellulose or sulfated cellulose forms from 1 to 2% by weight of the weight of the cementitious material. In another embodiment the fibrillated low DS carboxyalkyl cellulose or cellulose alkylsulfonic acid or phosphorylated cellulose or sulfated cellulose or the cellulose fibers mixed with fibrillated low DS carboxyalkyl cellulose or cellulose alkylsulfonic acid or phosphorylated cellulose or sulfated cellulose forms from 0.1 to 1% by weight of the weight of the cementitious material. In another embodiment the fibrillated low DS carboxyalkyl cellulose or cellulose alkylsulfonic acid or phosphorylated cellulose or sulfated cellulose or the cellulose fibers mixed with fibrillated low DS carboxyalkyl cellulose or cellulose alkylsulfonic acid or phosphorylated cellulose or sulfated cellulose forms from 0.25 to 0.75% by weight of the weight of the cementitious material. In another embodiment the fibrillated low DS carboxyalkyl cellulose or cellulose alkylsulfonic acid or phosphorylated cellulose or sulfated cellulose or the cellulose fibers mixed with fibrillated low DS carboxyalkyl cellulose or cellulose alkylsulfonic acid or phosphorylated cellulose or sulfated cellulose forms from 0.4 to 0.6% by weight of the weight of the cementitious material.

When only fibrillated low DS carboxyalkyl cellulose or cellulose alkylsulfonic acid or phosphorylated cellulose or sulfated cellulose is used, lower amounts will be sufficient relative to a mixture containing the same fibrillated low DS carboxyalkyl cellulose and cellulose fibers having the same performance. The low DS carboxyalkyl cellulose by itself is more workable in cement and concrete than the low DS carboxyalkyl cellulose and cellulose fibers. The same is true of cellulose alkylsulfonic acid, phorphorylated and sulfated cellulose.

The wood for the wood pulp fibers may be any softwood or hardwood such as pine, spruce, larch, Douglas fir, fir, hemlock, cedar, redwood, aspen, basswood, beech, birch, cottonwood, gum, maple, ash, chestnut, elm, or eucalyptus. It may be pulped by any standard pulping process such as kraft or sulfite. The wood pulp fiber is bleached by any standard bleaching process.

The fiber is pulped and bleached or partially bleached to remove hemicelluloses and lignin which can be deleterious to the curing of the cement.

The fibrillated low DS carboxyalkyl cellulose or cellulose alkylsulfonic acid or phosphorylated cellulose or sulfated cellulose or the cellulose fibers mixed with fibrillated low DS carboxyalkyl cellulose or cellulose alkylsulfonic acid or phosphorylated cellulose or sulfated cellulose is added to the water and cementitious mix.

Specific examples of cement-based materials that can be used include aluminous cement, blast furnace cement, calcium aluminate cement, Type I Portland cement, Type IA Portland cement, Type II Portland cement, Type IIA Portland cement, Type III Portland cement, Type IIIA, Type IV Portland cement, Type V Portland cement, hydraulic cement such as white cement, gray cement, blended hydraulic cement, Type IS-Portland blast-furnace slag cement, Type IP and Type P-Portland-pozzolan cement, Type S-slag cement, Type I (PMY pozzolan modified Portland cement, and Type I (SM)-slag modified Portland cement, Type GU-blended hydraulic cement, Type HE-high-early-strength cement, Type MS-moderate sulfate resistant cement, Type HS-high sulfate resistant cement, Type MH-moderate heat of hydration cement, Type LH-low heat of hydration cement, Type K expansive cement, Type O expansive cement, Type M expansive cement, Type S expansive cement, regulated set cement, very high early strength cement, high iron cement, and oil-well cement, further concrete fiber cement deposits and any composite material including any of the above listed cement.

The different types of cement can be characterized by The American Society for Testing and Materials (ASTM) Specification C-150. For example, Type I Portland cement is a general-purpose cement suitable for all uses. It is used in general construction projects such as buildings, bridges, floors, pavements, and other precast concrete products. Type IA Portland cement is similar to Type I with the addition of air-entraining properties. Type II Portland cement generates less heat, at a slower rate, and has a moderate resistance to sulfate attack. Type IIA Portland cement is identical to Type II with the addition of air-entraining properties. Type III Portland cement is a high-performance or high-early-strength cement and causes concrete to set and gain strength rapidly. Type III is chemically and physically similar to Type I, except that its particles have been ground finer. Type IIIA is an air-entraining, high-early-strength cement. Type IV Portland cement has a low heat of hydration and develops strength at a slower rate than other cement types, making it preferable for use in dams and other massive concrete structures where there is little chance for heat to escape. Type V Portland cement is used only in concrete structures that will be exposed to severe sulfate action, principally where concrete is exposed to soil and groundwater with a high sulfate content.

The fibrillated low DS carboxyalkyl cellulose, cellulose alkylsulfonic acid, phosphorylated cellulose or sulfated cellulose or cellulose pulp fibers mixed with fibrillated low DS carboxyalkyl cellulose, cellulose alkylsulfonic acid, phosphorylated cellulose or sulfated cellulose are useful in high performance concrete which have low amounts of water as compared to a cementitious mixture or a standard concrete mixture.

The cement-based material can include other components or fillers as known by those skilled in the art to which this disclosure pertains, such as those used to form various types of concretes. For example, the cement-based material can include aggregates, air-entraining agents, retarding agents, accelerating agents such as catalysts, plasticizers, corrosion inhibitors, alkali-silica reactivity reduction agents, bonding agents, colorants, and the like. "Aggregates" as used herein, unless otherwise stated, refer to granular materials such as sand, gravel, crushed stone or silica fume. Aggregates can be divided into fine aggregates and coarse aggregates. An example of fine aggregates includes natural sand, crushed stone or silica fume with most particles passing through a ⅜-inch (9.5-mm) sieve. An example of coarse aggregates includes particles greater than about 0.19 inch (4.75 mm), but generally range between about ⅜-inch and about 1.5 inches (9.5 mm to 37.5 mm) in diameter, such as gravel. Aggregates such as natural gravel and sand can be dug or dredged from a pit, river, lake, or seabed. Crushed aggregate can be produced by crushing quarry rock, boulders, cobbles, or large-size gravel. Other examples of aggregate materials include recycled concrete, crushed slag, crushed iron ore, or expanded (i.e., heat-treated) clay, shale, or slate.

The fibrillated low DS carboxyalkyl cellulose, cellulose alkylsulfonic acid phosphorylated cellulose or sulfated cellulose or the cellulose fibers mixed with fibrillated low DS carboxyalkyl cellulose, cellulose alkylsulfonic acid, phosphorylated cellulose or sulfated cellulose can be added to the cementitious material by the following procedure:

(a) The fibrillated low DS carboxyalkyl cellulose, cellulose alkylsulfonic acid phosphorylated cellulose or sulfated cellulose or cellulose fibers mixed with fibrillated low DS carboxyalkyl cellulose, cellulose alkylsulfonic acid, phosphorylated cellulose or sulfated cellulose are mixed in water to disperse.

(b) Superplacticizer (SP) may be added to the dispersion in water after dispersion.

(c) The mix of water, fibrillated material, SP and possibly cellulose fiber is added to the cementitious material and allowed to soak in. The time is 30 seconds.

(d) The ingredients are mixed at low speed. The time is dependent on the size of the batch. The time is a minimum of 1 minute and can be from 1 minute to 5 minutes.

(e) An additional amount of superplasticizer is added slowly to the mix, if necessary, to improve workability.

(f) The batch is mixed at high speed. Again, the time is dependent on the size of the mix. The time is a minimum of 1 minute and can be from 1 minute to 5 minutes.

(g) More superplasticizer is added slowly to the mix, if necessary, to further improve workability.

(h) The mix is rested for 30 seconds. (This step is optional.)

(i) The mix is further mixed at high speed for a minimum of 1 minute and can be from 1 minute to 5 minutes.

(j) More superplasticizer is added slowly to the mix, if necessary, to further improve workability.

An increase in the amount of fibrillated material or the cellulose fiber mixed with fibrillated material may require an increase in the amount of superplasticizer. The addition of fiber reduces the flow of the cementitious mix and superplasticizer is added to increase the flow. The more fiber that is added the greater the decrease in the flow and the more superplasticizer that is required to return the flow to normal. A fiber addition of around 0.5% of the weight of the cementitious mix, 0.35 to 0.65% of the cementitious mix will minimize the amount of superplasticizer needed. The use of fibrillated carboxyalkyl cellulose, cellulose alkylsulfonic acid, phosphorylated cellulose or sulfated cellulose by itself should reduce the need for superplasticizer.

The fibrillated carboxyalkyl cellulose or the cellulose fiber mixed with fibrillated carboxyalkyl cellulose provides carboxyalkyl content to the cementitious mix. The sodium, potassium or ammonium salts of carboxyalkyl groups bind up and release the water in the cement in a controlled manner. The same is true of cellulose alkylsulfonic acid, phosphorylated cellulose and sulfated cellulose. The sodium, potassium or ammonium salts of cellulose alkylsulfonic, phosphate and sulfate groups can also bind and release water.

In one embodiment from 20 to 600 meq carboxyalkyl content per 100 kilograms of cementitious material is used (20-60 meq/100 g of carboxyalkylated material, 0.1-1% carboxyalkylated material in cement). In another embodiment 20 to 500 meq carboxyalkyl content per 100 kilograms of cementititious material is used (20-50 meq/100 g of carboxyalkylated material, 0.1-1% carboxyalkylated material in cement). In another embodiment 20 to 400 meq carboxyalkyl content per 100 kilograms of cementititious material is used (20-40 meq/100 g of carboxyalkylated material, 0.1-1% carboxyalkylated material in cement). In another embodiment 20 to 1500 meq carboxyalkyl content per 100 kilograms of cementititious material is used (20-150 meq/100 g of carboxyalkylated material, 0.1-1% carboxyalkylated material in cement).

Similar milliequivalents of alkylsulfonic acid groups, phosphate groups or sulfate groups will occur with the cellulose sulfonic acid, phosphorylated and sulfated material.

Lower amount of fibrillated carboxyalkyl cellulose only or the cellulose fibers mixed with fibrillated carboxyalkyl cellulose can provide fibers having the same number of meq. Of carboxyalkyl groups/100 g of fibers. Fibrillated carboxyalkyl cellulose sample with a carboxyalkyl content of 20 meq/100 g contains half the carboxyalkyl groups of a sample of fibrillated carboxyalkyl cellulose with a carboxyalkyl content of 40 meq/100 g and twice as much material is needed to provide the same carboxyalkyl content to the cementitious mixture. This is also true of cellulose alkylsulfonic acid, phosphorylated cellulose and sulfated cellulose.

The critical period in cement or concrete setting is the first seven days. It has also been found that the first two days is an important period. Cracks occurring during the early setting period are detrimental to the long term durability of the cement or concrete.

The addition of fibrillated carboxyalkyl cellulose or the cellulose fiber mixed with fibrillated carboxyalkyl cellulose has no impact on compressive strength. Compressive strength trends remain the same.

Experiment 1

Low DS carboxymethyl cellulose fibers 45 g OD (Oven Dry) of DS=0.45, prepared using bleached cellulose fibers were fibrillated in 2500 ml of de ionized water at 5000 RPM in a Waring blender for 30 minutes. The procedure was repeated 10 times to provide 450.0 g OD low DS CMC fibrils in 25 liters of water. The 25 liters of aqueous dispersion containing 450.0 g of low DS CMC was placed in a large Hobart mixer. To the dispersion was added 2050 g OD of bleached cellulose fibers and mixed well for 2 hours. The carboxyalkyl level of the mixture was determined to be 36 meq/100 g?.

Experiment 2

Low DS carboxymethyl cellulose fibers 65.0 g OD (Oven Dry) of DS=0.45, prepared using bleached cellulose fibers were fibrillated in 3500 ml of de ionized water at 5000 RPM in a Waring blender for 30 minutes. The procedure was repeated 5 times to provide 325.0 g OD low DS CMC fibrils in 17.5 liters of water. The 17.5 liters of aqueous dispersion containing 325.0 g of low DS CMC was placed in a large Hobart mixer. To the dispersion was added 925.0 g OD of bleached cellulose fibers and mixed well for 2 hours. The carboxyalkyl level of the mixture was determined to be 48 meq/100 g?.

Two different fibrillated carboxymethyl cellulose samples were tried, Sample 4 having a carboxyalkyl level of 36.93 meq/100 g and Sample 12 having a carboxyalkyl level of 48.34 meq/100 g. Both samples were at 0.45 DS. Each was also tried at addition rates of 0.25%, 0.5% and 1% of the weight of the cementitious mixture.

The paste mix is given in Table 1 for both the Sample 4 and the Sample 12. The mortar mix is given in Table 2 for both the Sample 4 and the Sample 12.

In the following tests, superplasticizer was added to maintain mix workability. The cement was Portland cement type 1. The mortar mix also included sand. In the following tables MC is moisture content of the fiber, k is the amount of moisture in the fiber available for internal curing of the cement, SF is silica fume, SP is superplasticizer, w/cm is water to cementitious material ratio, and $w_e$/cm* is water entrained to cementitious material ratio.

TABLE 1

Details of companion paste mix designs per 1 kg of cementitious material.

| | | Fiber type | | | | | |
|---|---|---|---|---|---|---|---|
| | | 4 | | | 12 | | |
| | | Fiber dosage rate | | | | | |
| | % | 0.25 | 0.5 | 1 | 0.25 | 0.5 | 1 |
| MC | % | 91.37 | 91.37 | 91.37 | 93.09 | 93.09 | 93.09 |
| k | | 1.28 | 1.,28 | 1.28 | 1.24 | 1.24 | 1.24 |
| Cement | g | 900 | 900 | 900 | 900 | 900 | 900 |
| SF | g | 100 | 100 | 100 | 100 | 100 | 100 |
| Water total | g | 300 | 300 | 300 | 300 | 300 | 300 |
| Fiber dry | g | 2.50 | 5 | 10 | 2.50 | 5 | 10 |
| SP | ml | 3.3 | 3.3 | 5.3 | 4 | 5.3 | 8.7 |
| w/cm | | 0.3 | 0.3 | 0.3 | 0.3 | 0.3 | 0.3 |
| $w_e$/cm* | | 0.013 | 0.013 | 0.013 | 0.012 | 0.012 | 0.012 |

TABLE 2

Details of mortar mix designs per 1 kg of cementitious material

| | | Fiber type | | | | | |
|---|---|---|---|---|---|---|---|
| | | 4 | | | 12 | | |
| | | Fiber dosage rate | | | | | |
| | % | 0.25 | 0.5 | 1 | 0.25 | 0.5 | 1 |
| MC | % | 91.37 | 91.37 | 91.37 | 93.09 | 93.09 | 93.09 |
| K | | 1.28 | 1.,28 | 1.28 | 1.24 | 1.24 | 1.24 |
| Cement | g | 900 | 900 | 900 | 900 | 900 | 900 |
| SF | g | 100 | 100 | 100 | 100 | 100 | 100 |
| Water total | g | 300 | 300 | 300 | 300 | 300 | 300 |
| Fiber dry | g | 2.50 | 5 | 10 | 2.50 | 5 | 10 |
| SP | ml | 4.9 | 8.9 | 17.8 | 5.7 | 8.9 | 19.4 |
| w/cm | | 0.3 | 0.3 | 0.3 | 0.3 | 0.3 | 0.3 |
| $W_e$/cm* | | 0.013 | 0.013 | 0.013 | 0.012 | 0.012 | 0.012 |

The mixing procedure was as follows:
(a) The test fibers were mixed in water to disperse.
(b) Superplasticizer was added after the dispersion of fibers in water.
(c) The mix of water, fiber and superplasticizer was added to the cementitious material and allowed to soak for 30 seconds.
(d) The batch was mixed at slow speed for 1 minute. For the mortar sand was added while mixing. More superplasticizer was added, if necessary, to improve workability.
(e) The batch was mixed at medium speed for at least 1 minute. More superplasticizer was added, if necessary, to improve workability.
(f) Flow was measured.
(g) The batch was mixed further at medium speed for 1 minute. More superplasticizer was added, if necessary, to improve workability.

The mix was vibrated and tamped into the molds while filling the molds for the autogenous shrinkage samples and tamped as per ASTM C109 requirements for the compression cubes.

Table 3 describes the experiments:

TABLE 3

| | | CMC dosage rate | Paste consistency | Initial set | Final set | Mortar flow | Superplasticizer ml per 100 g cementitious material | |
|---|---|---|---|---|---|---|---|---|
| Ex. | Label | % | Mm | min | Min | % | Paste | Mortar |
| 3 | 4-0.25 | 0.25 | 34 | 205 | 295 | 62 (56) | 0.33 | 0.49 |
| 4 | 4-0.5 | 0.5 | 36 | 223 | 335 | 62 (64) | 0.33 | 0.81 (0.89) |
| 5 | 4-1 | 1 | 30 | 322 | 415 | 52 (50) | 0.53 | 1.78 (1.78) |
| 6 | 4-1 | 1 | 8 | 161 | 247 | — | 0.33 | — |
| 7 | 12-0.25 | 0.25 | 27 | 322 | 415 | 60 (52) | 0.40 | 0.57 |
| 8 | 12-0.5 | 0.5 | 27 | 317 | 392 | 68 (60) | 0.53 | 0.89 (0.98) |
| 9 | 12-1 | 1 | 28 | 538 | 672 | 56 (54) | 0.87 | 1.94 (2.13) |
| 10 | 12-1 | 1 | 7 | 228 | 372 | — | 0.40 | — |

Autogenous Shrinkage Test

Autogenous deformation was measured as described by O. M. Jensen and P. F. Hansen in "*A dilatometer for measuring autogenous shrinkage deformation in hardening cement paste*", Materials and Structures, 1995, 28(181):406-409. Specimens were weighed and sealed in corrugated polyethylene tubes and stored at ambient temperature. Autogenous linear deformation measurements were monitored continuously and recorded for 14 days. The initial measurement was taken at final set time measured by ASTM C191 for each mix. Three (3) specimens were tested for each mix. Table 5 gives the results.

The autogenous shrinkages of the different mixes for both paste and mortar were measured over time and compared to controls.

Figure 7:
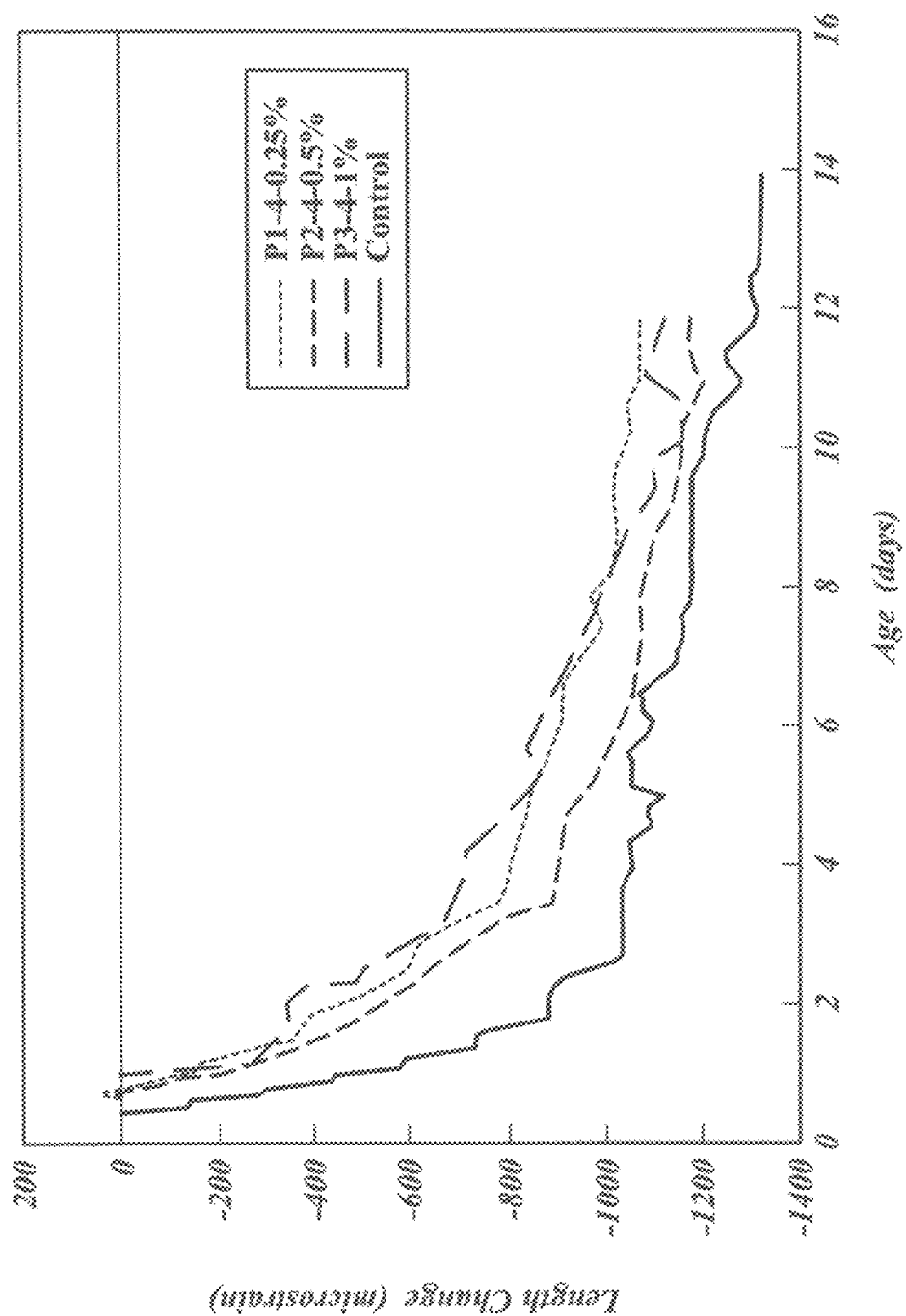
FIGS. 7 and 8 are graphs showing age v. length change for cement pastes for three addition levels of fibrillated carboxymethyl cellulose and a control. Each of the figures is at a different carboxymethyl meq/100 g level.
Figure 8:
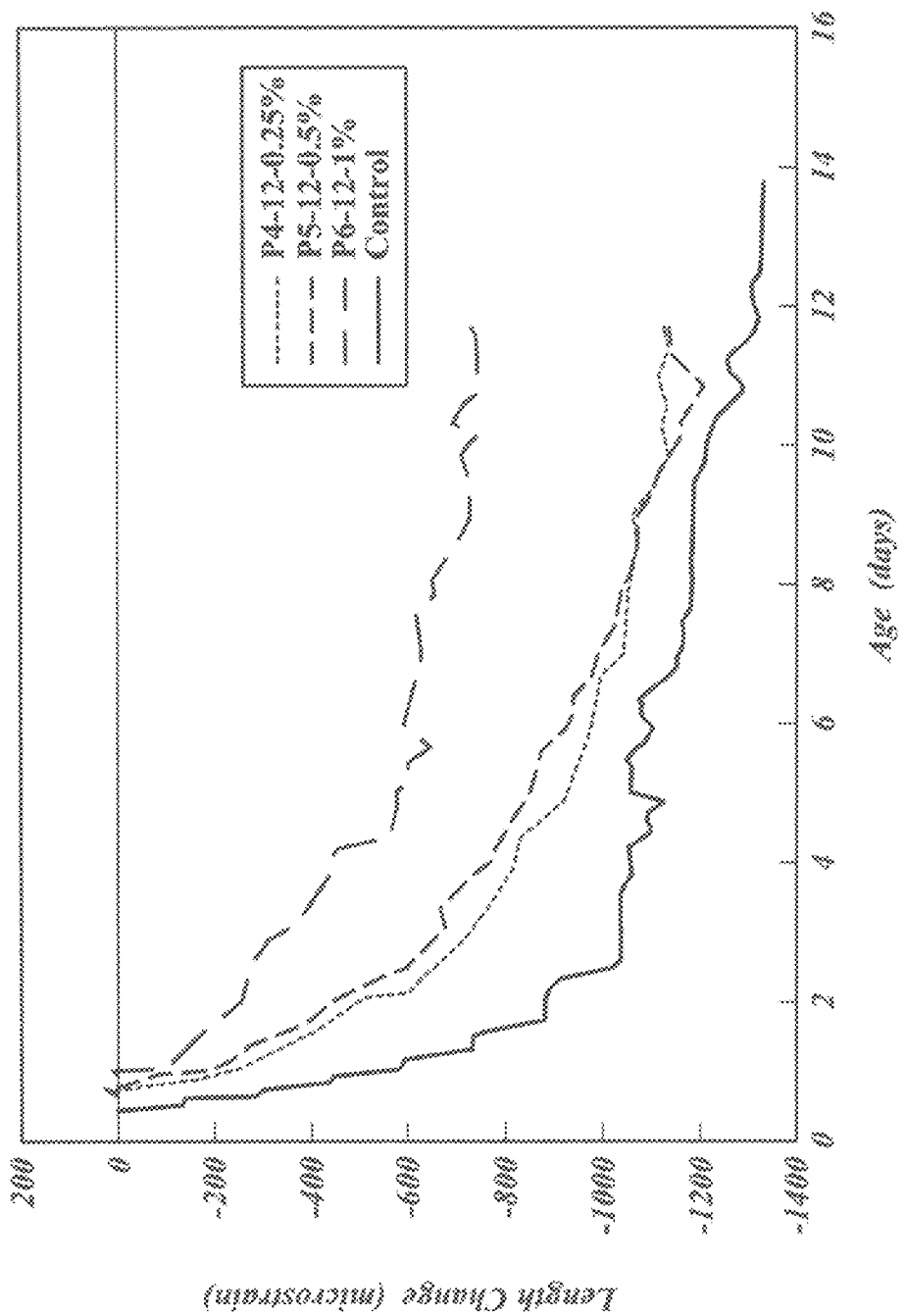

The paste results are shown in FIGS. 7 and 8. FIG. 7 shows the sample 4 results and FIG. 8 shows the sample 12 results. Both were compared to a control. It was noted that the autogenous shrinkage for sample 4 at any of the additions was about the same during the first two days and there was some differentiation after that. All of the addition rates were better than the control. There was a difference for sample 12. The 1% addition performed better than the other two additions. All additions performed better than the control.

Figure 9:
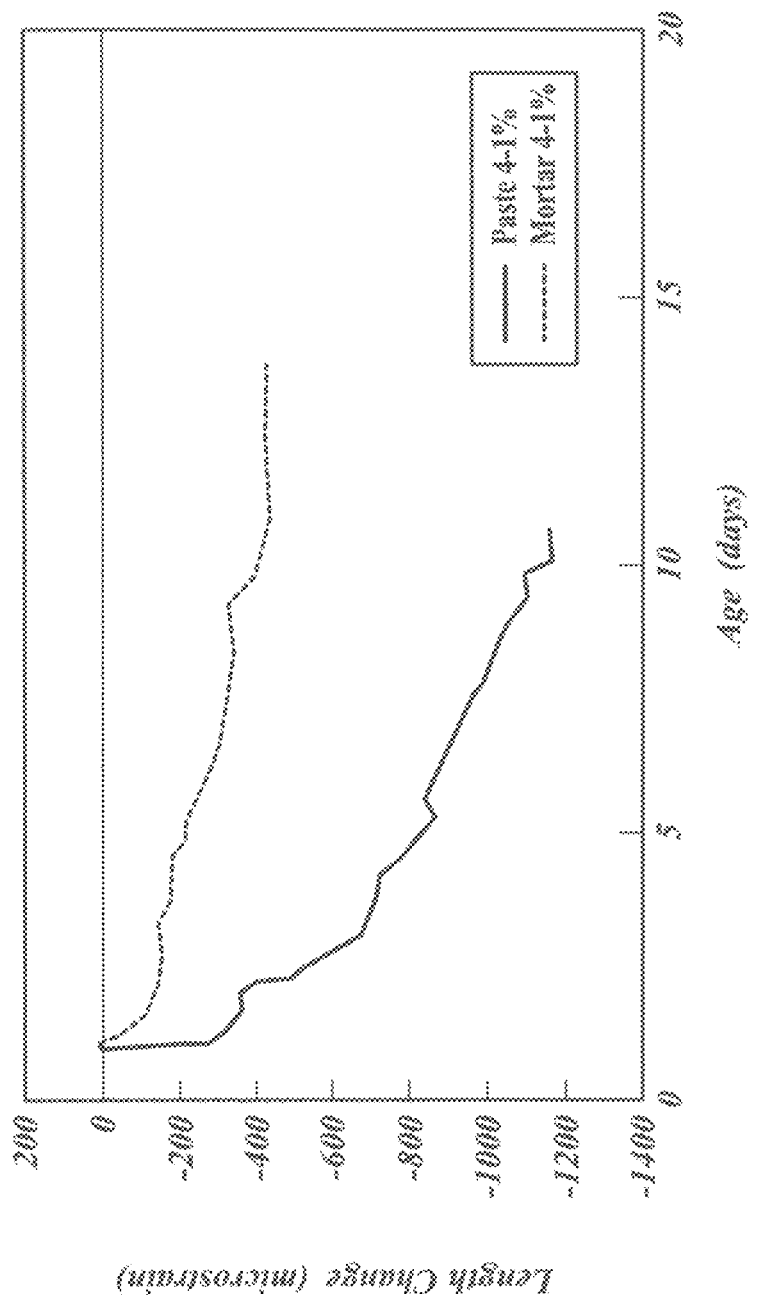
FIGS. 9 and 10 are graphs showing an age v. length change comparison of cement paste and mortar at a 1% addition level of fibrillated carboxymethyl cellulose. Each of the figures is at a different carboxymethyl meq/100 g level.

FIG. 9 is a comparison over time of the autogenous shrinkage of examples 5, mortar, and 6, paste. Both are sample 4 and are at 1% addition.

Figure 10:
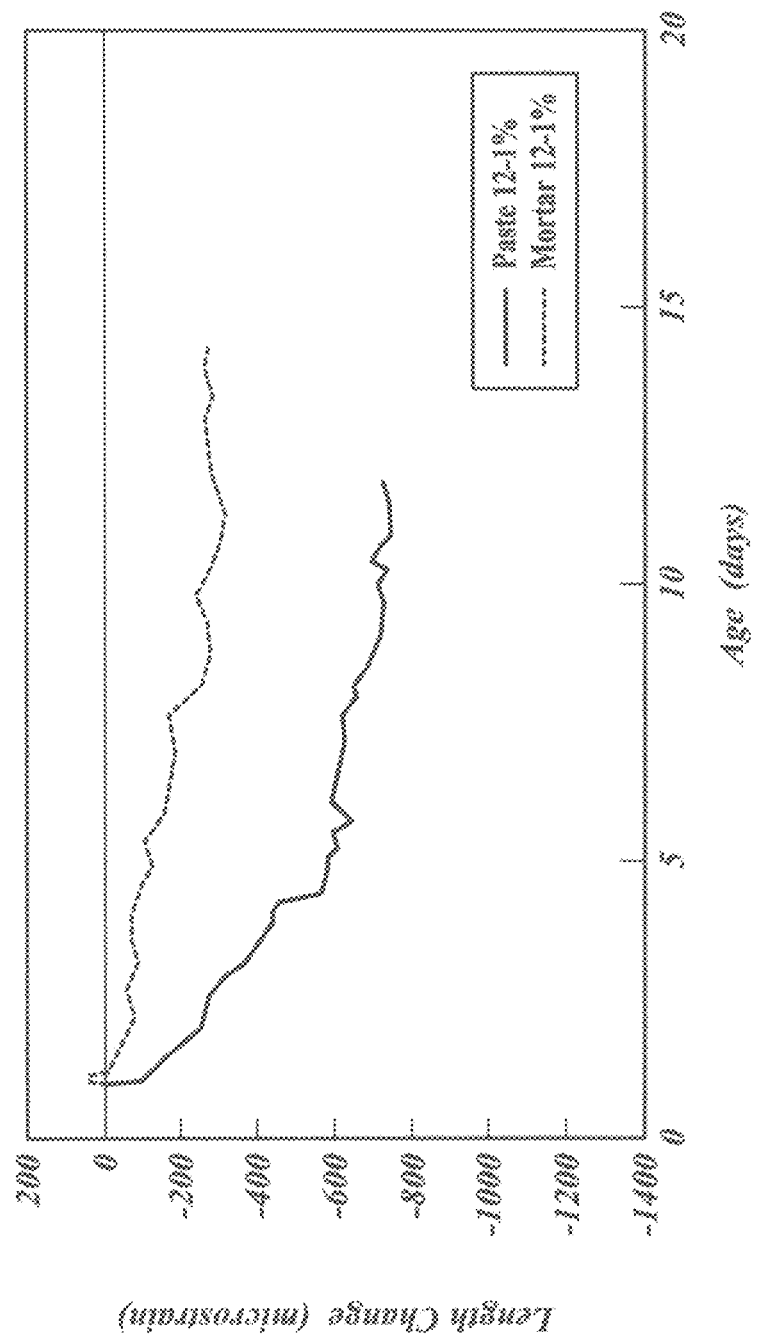

FIG. 10 is a comparison over time of the autogenous shrinkage of examples 9, mortar, and 10, paste. Both are sample 12 and are at 1% addition.

Figure 11:
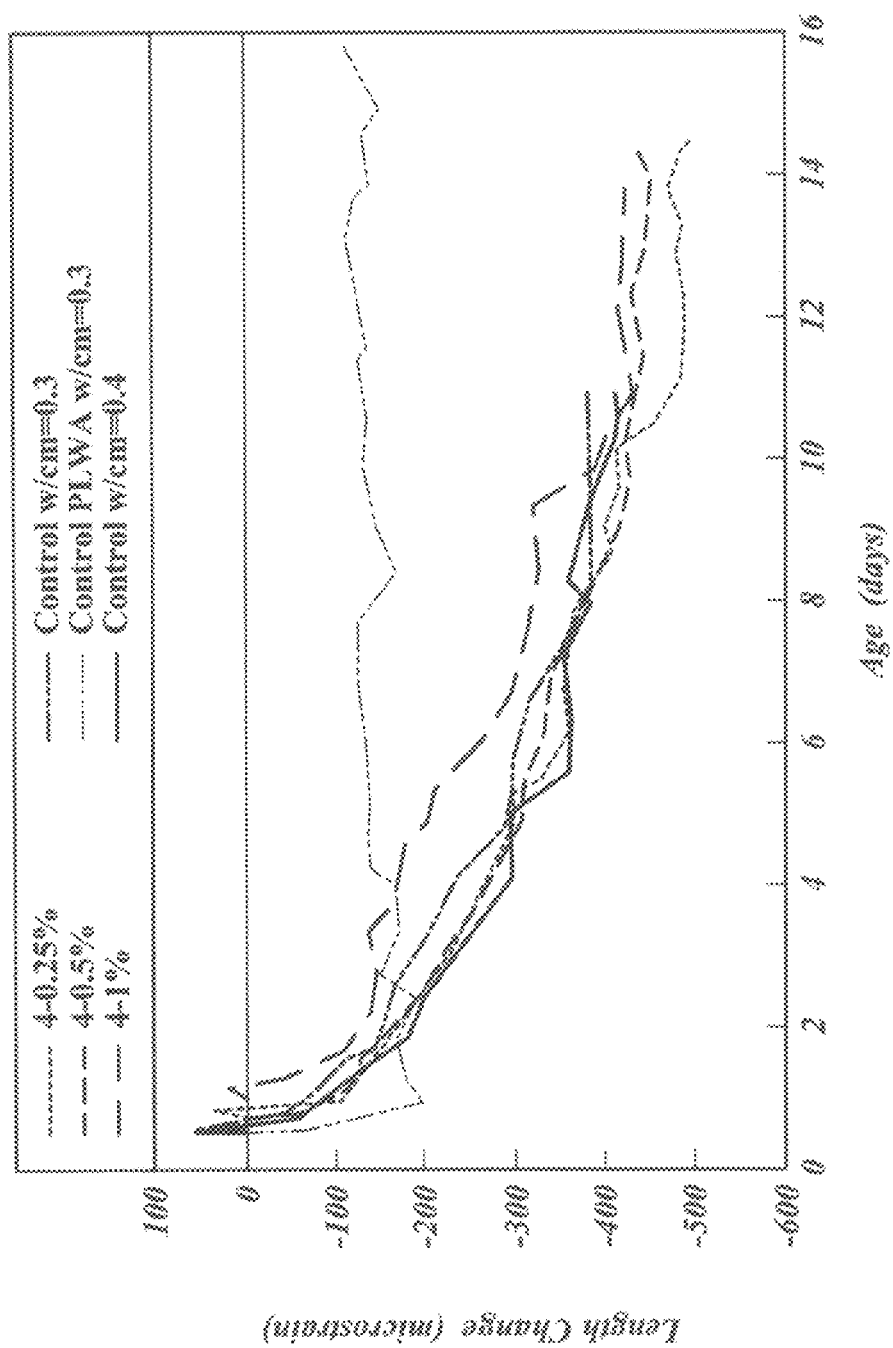
FIGS. 11 and 12 are graphs showing age v. length change for mortars for three addition levels of fibrillated carboxymethyl cellulose and three controls. Each of the figures is at a different carboxymethyl meq/100 g level.
Figure 12:
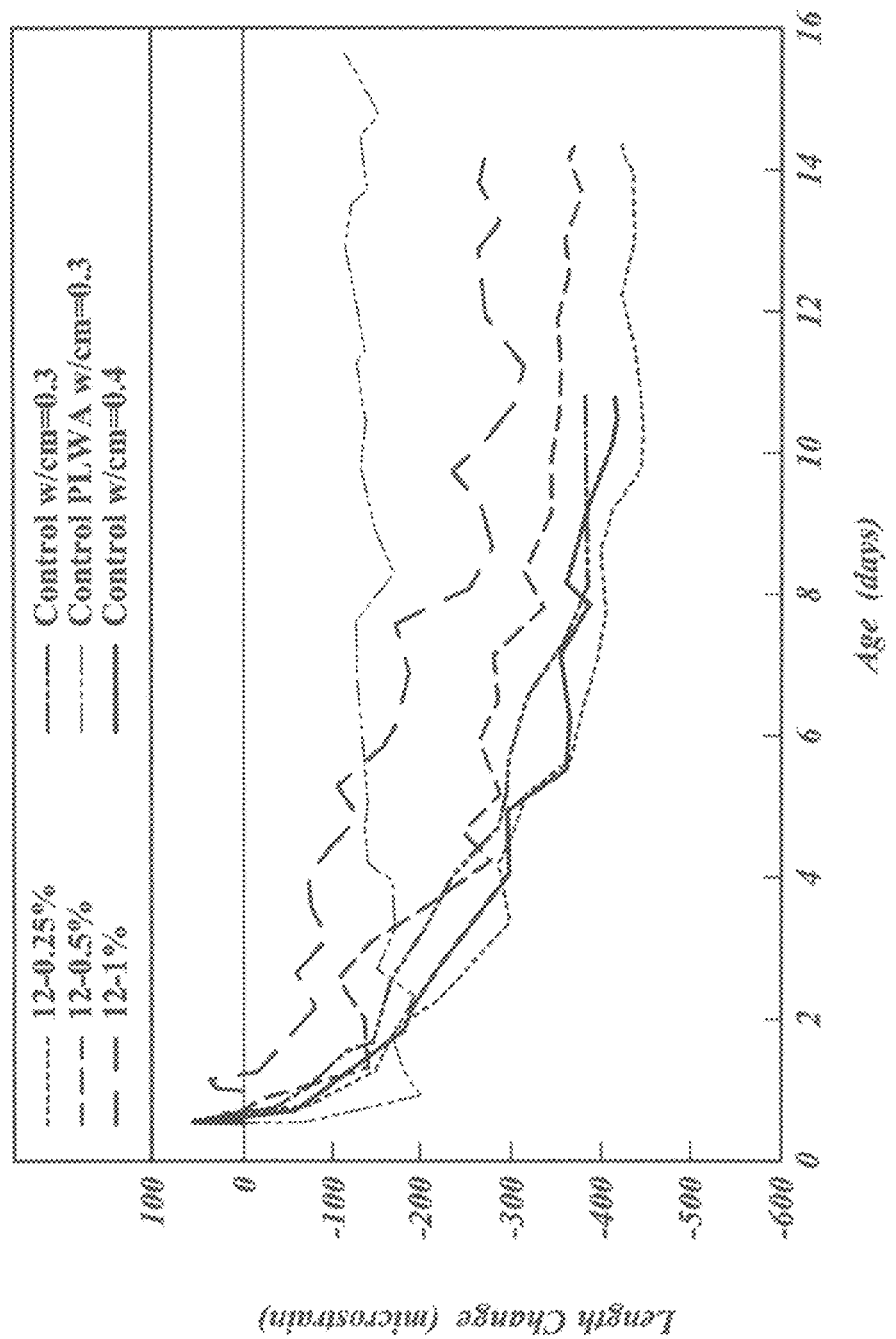

The mortar results are shown in FIGS. 11 and 12.

Figure 1:
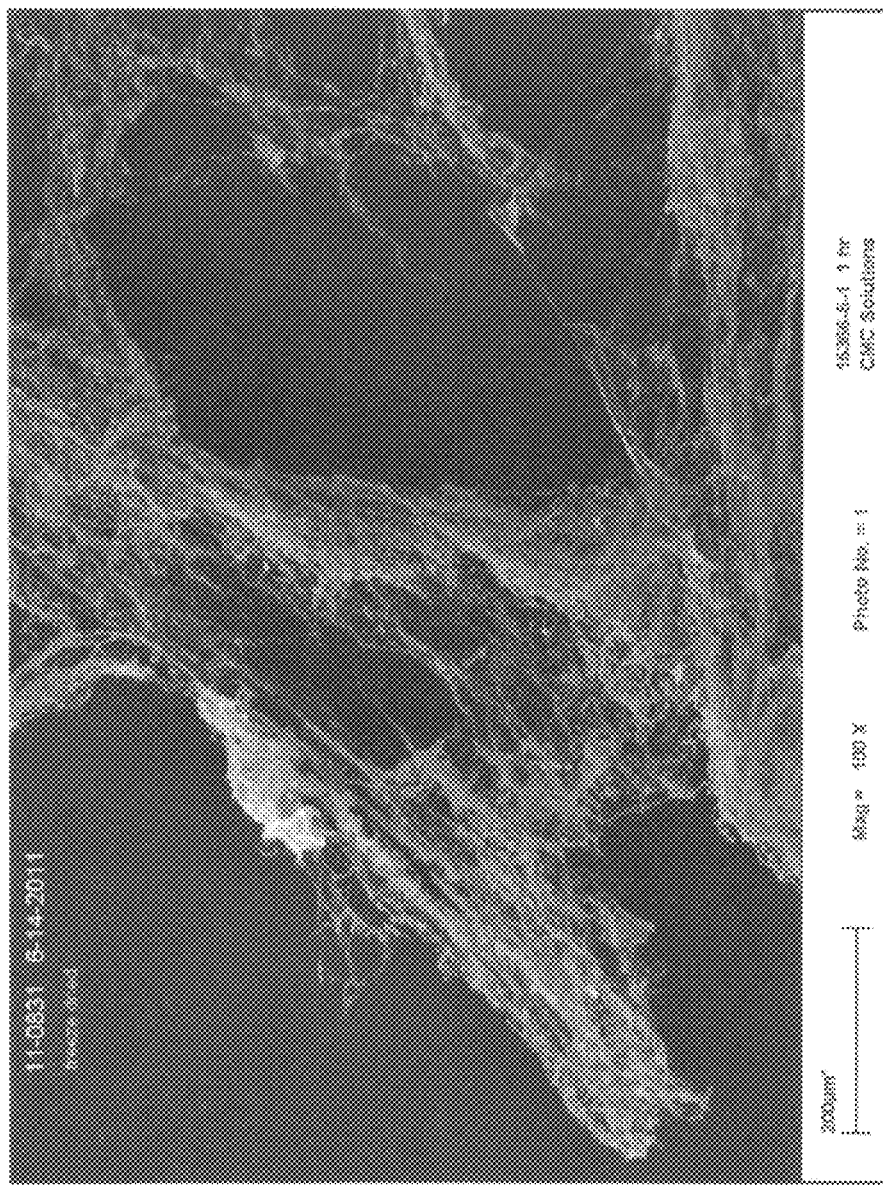
FIGS. 1-3 are photomicrographs of a sample of fibrillated carboxymethyl cellulose at magnifications of 100 times, 1000 times and 10,000 times respectively.
Figure 2:
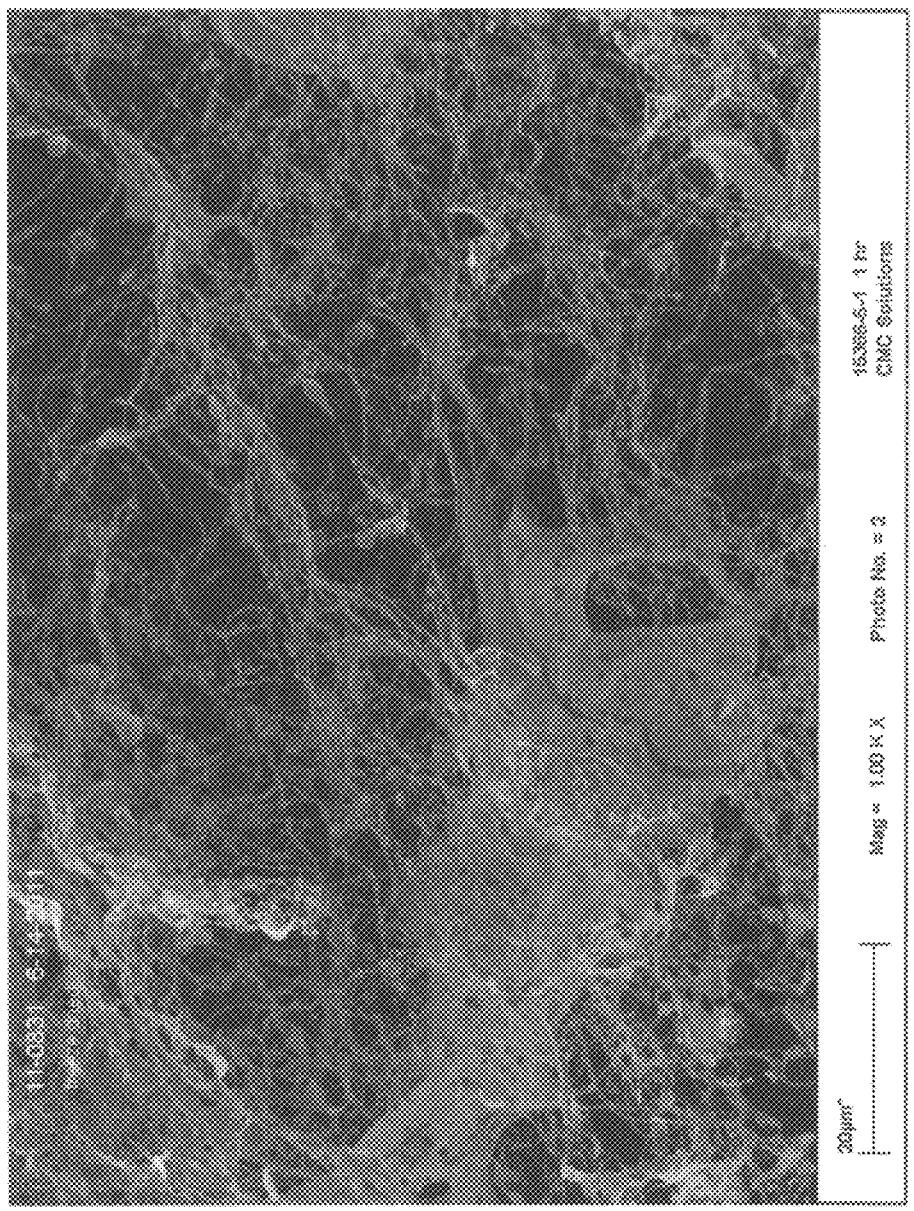
Figure 3:
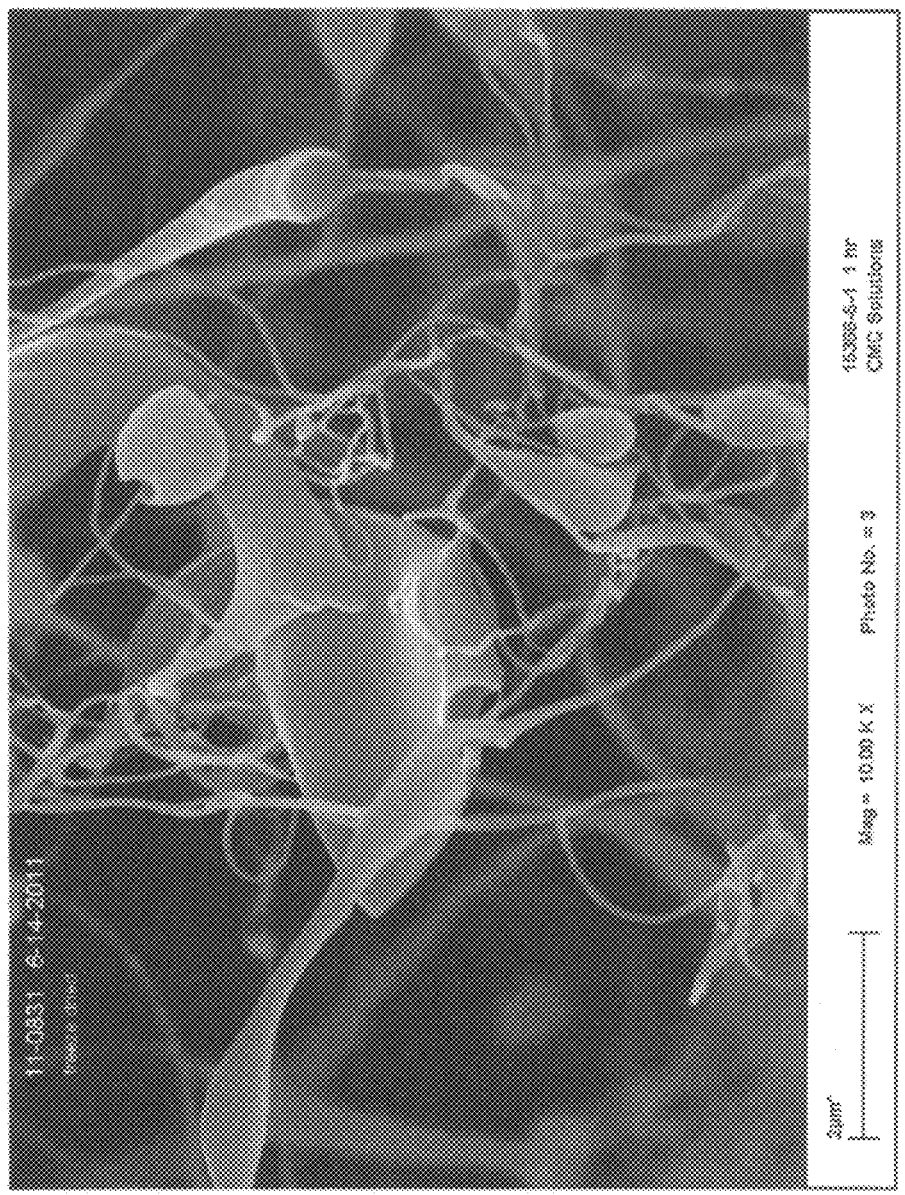

The effect of different addition of GP5 on autogenous shrinkage was also tried. The addition rates were The results are shown in FIG. 2. The effect of a 2% addition of GP5 was similar to the PLWA addition in FIG. 1. A 2% fiber addition requires a large amount of superplasticizer. The goal would be to use 0.5% addition of fiber with the same amount of carboxyalkyl groups as is in the 2% fiber addition. This would mean using a fiber having a carboxyalkyl content of 40 meq/100 g or more of carboxyalkyl groups.

It is possible to make fibers having carboxyalkyl content of 40 meq/100 g or more. It is expected the autogenous shrinkage of a fiber having a carboxyalkyl content of 40 meq/100 g or more will have an autogenous shrinkage similar to the 2% addition of GP5.

Figure 13:
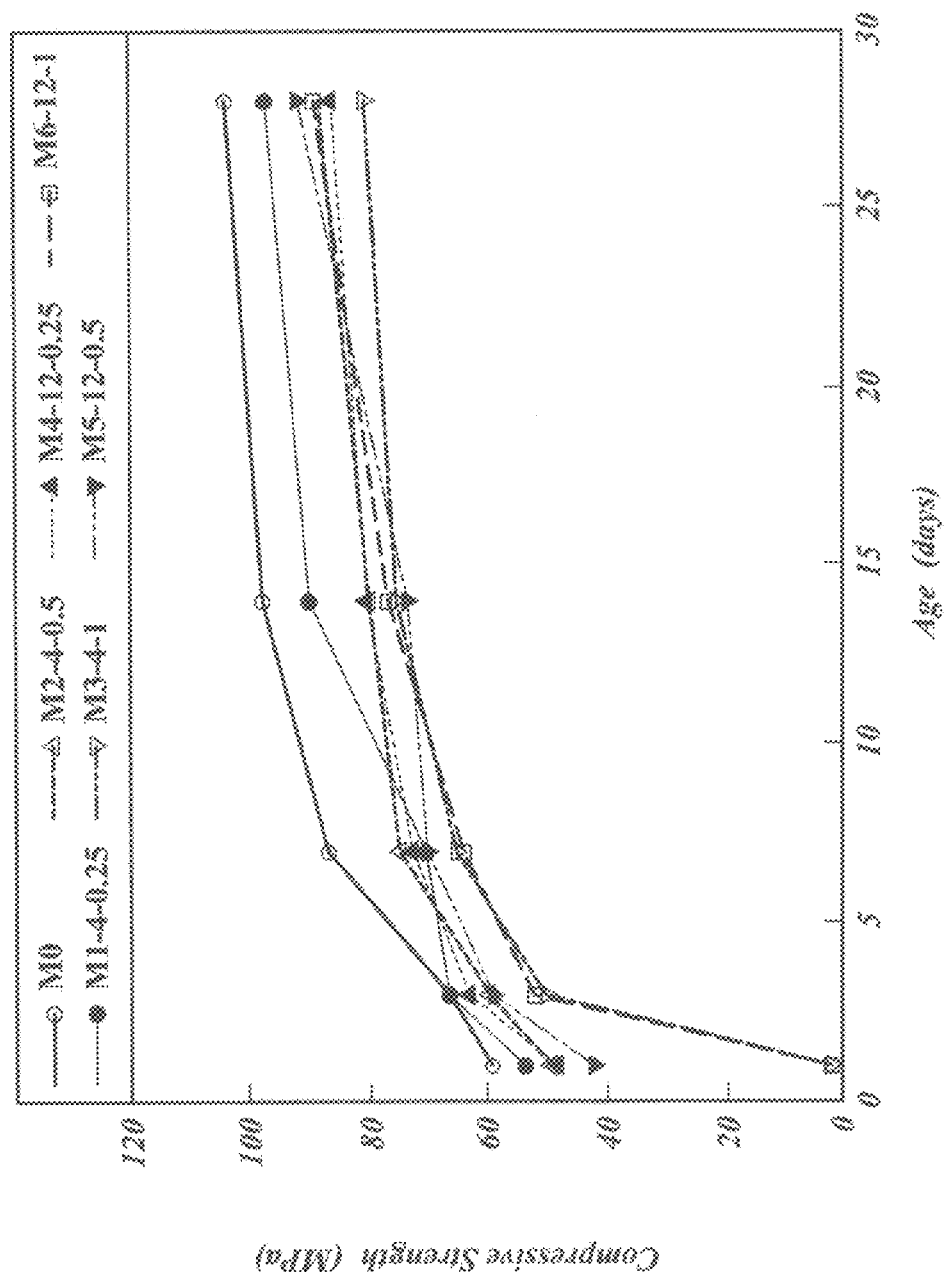
FIG. 13 is a graph showing age vs. compressive strength for a number of cementitious mixtures.

The compressive strength of the fiber addition was also determined. FIG. 13 shows the results. The addition of fibers had not impact on compressive strength.

Although preferred embodiments of the invention have been described using specific terms, such description is for illustrative purposes only. The words used are words of description rather than of limitation. It is to be understood that changes and variations may be made by those of ordinary skill in the art without departing from the spirit or scope of the present invention, which is set forth in the following claims. The spirit and scope of the appended claims should not be limited to the description of the preferred versions contained herein.

The invention claimed is:

1. A cured cementitious structure comprising
   cementitious material wherein the cementitious material is cement, and
   fibrillated nano or micro carboxyalkyl cellulose, cellulose alkylsulfonic acid, phosphorylated cellulose or sulfated cellulose having a degree of substitution of 0.01 to 0.45 and a carboxyalkyl, alkylsulfonic acid, phosphate or sulfate content of 10 to 150 meq/100 g of, respectively, carboxyalkyl cellulose, cellulose alkylsulfonic acid, phosphorylated cellulose or sulfated cellulose, and the carboxyalkyl cellulose, cellulose alkylsulfonic acid, phosphorylated cellulose or sulfated cellulose are 0.1 to 5% by weight of the dry weight of the cementitious material.

2. The cured cementitious structure of claim 1 wherein the carboxyalkyl cellulose is carboxymethyl cellulose or carboxyethyl cellulose.

3. The cementitious structure of claim 1 wherein the fibers have a carboxyalkyl, alkylsulfonic acid, phosphate or sulfate content of 20 to 100 meq/100 g of, respectively, carboxyalkyl cellulose, cellulose alkylsulfonic acid, phosphorylated cellulose or sulfated cellulose.

4. The cementitious structure of claim 1 wherein the fibers have a carboxyalkyl, alkylsulfonic acid, phosphate or sulfate content of 30 to 60 meq/100 g of, respectively, carboxyalkyl cellulose, cellulose alkylsulfonic acid, phosphorylated cellulose or sulfated cellulose.

5. The cementitious structure of claim 1 wherein the carboxyalkyl cellulose, cellulose alkylsulfonic acid, phosphorylated cellulose or sulfated cellulose is 0.25 to 0.75% by weight of the dry weight of the cementitious material.

6. The cementitious structure of claim 1 wherein the cementitious material further comprises aggregate material.

7. The cured cementitious structure of claim 6 wherein the carboxyalkyl cellulose is carboxymethyl cellulose or carboxyethyl cellulose.

8. The cementitious structure of claim 6 wherein the fibers have a carboxyalkyl, alkylsulfonic acid, phosphate or sulfate content of 20 to 100 meq/100 g of, respectively, carboxyalkyl cellulose, cellulose alkylsulfonic acid, phosphorylated cellulose or sulfated cellulose.

9. The cementitious structure of claim 6 wherein the fibers have a carboxyalkyl, alkylsulfonic acid, phosphate or sulfate content of 30 to 60 meq/100 g of, respectively, carboxyalkyl cellulose, cellulose alkyl sulfonic acid, phosphorylated cellulose or sulfated cellulose.

10. The cementitious structure of claim 6 wherein the carboxyalkyl cellulose, cellulose alkylsulfonic acid, phosphorylated cellulose or sulfated cellulose is 0.25 to 0.75% by weight of the dry weight of the cementitious material.

11. A method of curing cement comprising
    providing a mixture comprising cementitious material, water and fibrillated carboxyalkyl cellulose, cellulose alkylsulfonic acid, phosphorylated cellulose or sulfated cellulose having a degree of substitution of 0.01 to 0.45, allowing the mixture to cure,
    wherein the cementitious material comprises cement,
    wherein the fibrillated carboxyalkyl cellulose, cellulose alkylsulfonic acid, phosphorylated cellulose or sulfated cellulose have, respectively, a carboxyalkyl, alkyhlsulfonic acid, phosphate or sulfate content of 10 to 150 meq/100 g of, respectively, carboxyalkyl cellulose, cellulose alkylsulfonic acid, phosphorylated cellulose or sulfated cellulose, and
    wherein the carboxyalkyl cellulose, cellulose alkyl sulfonic acid, phosphorylated cellulose or sulfated cellulose are 0.1 to 5% by weight of the dry weight of the cementitious material.

12. The method of claim 11 wherein the carboxyalkyl cellulose is carboxymethyl cellulose or carboxyethyl cellulose.

13. The method of claim 11 wherein the fibers have a carboxyalkyl, alkylsulfonic acid, phosphate or sulfate content of 20 to 100 meq/100 g of, respectively, carboxyalkyl cellulose, cellulose alkylsulfonic acid, phosphorylated cellulose or sulfated cellulose.

14. The method of claim 11 wherein the fibers have a carboxyalkyl, alkylsulfonic acid, phosphate or sulfate content of 30 to 60 meq/100 g of, respectively, carboxyalkyl cellulose, cellulose alkysulfonic acid, phosphorylated cellulose or sulfated cellulose.

15. The method of claim 11 wherein the carboxyalkyl cellulose, cellulose alkylsulfonic acid, phosphorylated cellulose or sulfated cellulose is 0.25 to 0.75% by weight of the dry weight of the cementitious material.

16. The method of claim 11 wherein the cementitious material further comprises aggregate material.

17. The method of claim 16 wherein the carboxyalkyl cellulose is carboxymethyl cellulose or carboxyethyl cellulose.

18. The method of claim 16 wherein the fibers have a carboxyalkyl, alkylsulfonic acid, phosphate or sulfate content of 20 to 100 meq/100 g of, respectively, carboxyalkyl cellulose, cellulose alkyl sulfonic acid, phosphorylated cellulose or sulfated cellulose.

19. The method of claim 16 wherein the fibers have a carboxyalkyl, alkylsulfonic acid, phosphate or sulfate content of 30 to 60 meq/100 g of, respectively, carboxyalkyl cellulose, cellulose alkylsulfonic acide, phosphorylated cellulose or sulfated cellulose.

20. The method of claim 16 wherein the carboxyalkyl cellulose, cellulose alkylsulfonic acid, phosphorylated cellulose or sulfated cellulose is 0.25 to 0.75% by weight of the dry weight of the cementitious material.

* * * * *